United States Patent [19]
Albertins et al.

[11] 3,819,510
[45] June 25, 1974

[54] METHOD FOR PRODUCING HIGH QUALITY POLYMERIZATION REACTION MEDIA

[75] Inventors: Rusins Albertins, Naperville; Michael A. Stasiewicz, Chicago, both of Ill.

[73] Assignee: Standard Oil Company, Chicago, Ill.

[22] Filed: Sept. 21, 1972

[21] Appl. No.: 291,056

[52] U.S. Cl.......... 208/290, 260/677 A, 260/683.15
[51] Int. Cl.............................................. C07c 11/00
[58] Field of Search.................... 208/290, 237, 297; 260/676 AD, 677 A, 683.15

[56] References Cited
UNITED STATES PATENTS

| | | | |
|---|---|---|---|
| 2,919,242 | 12/1959 | Kolling et al. | 208/143 |
| 2,963,520 | 12/1960 | Neal | 260/676 AD |
| 3,249,648 | 5/1966 | Carter et al. | 260/677 A |
| 3,392,113 | 7/1968 | DeRosset | 260/676 R |
| 3,432,573 | 3/1969 | Keil et al. | 260/683.15 |
| 3,520,947 | 7/1970 | Blytas | 260/677 A |
| 3,557,236 | 1/1971 | Presswood et al. | 260/677 |
| 3,689,584 | 9/1972 | Kobetz | 260/677 A |
| 3,696,161 | 10/1972 | Kobetz | 260/677 A |

Primary Examiner—Delbert E. Gantz
Assistant Examiner—Juanita M. Nelson
Attorney, Agent, or Firm—Reed F. Riley; Arthur G. Gilkes; William T. McClain

[57] ABSTRACT

A process for producing high quality, polymerization-grade media comprising the steps of adding a metal alkyl compound to the polymerization media, holding the resulting mixture at a temperature greater than about ambient and less than about the critical temperature of the polymerization media for about 1 minute to about 180 minutes and finally substantially removing the reaction products and excess metal alkyl.

15 Claims, 4 Drawing Figures

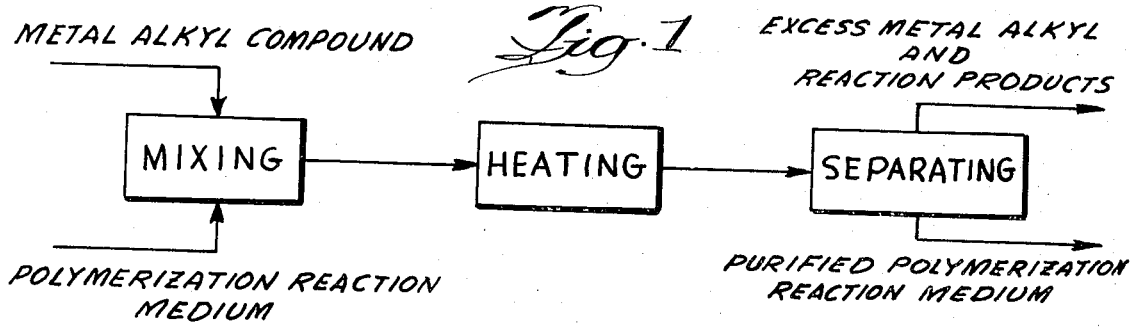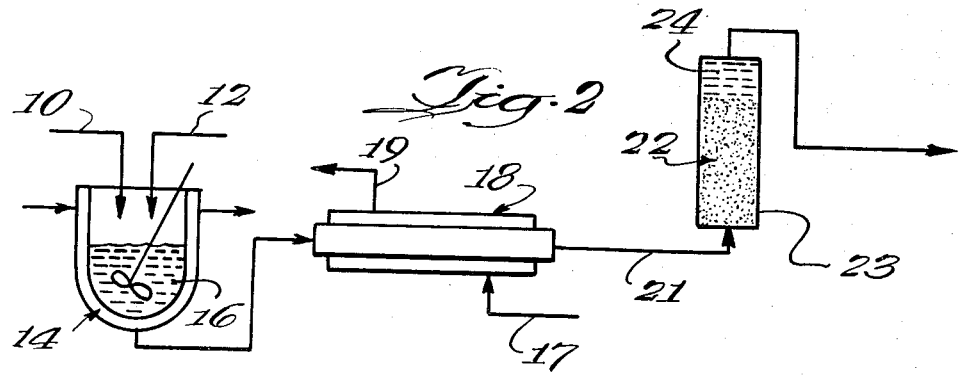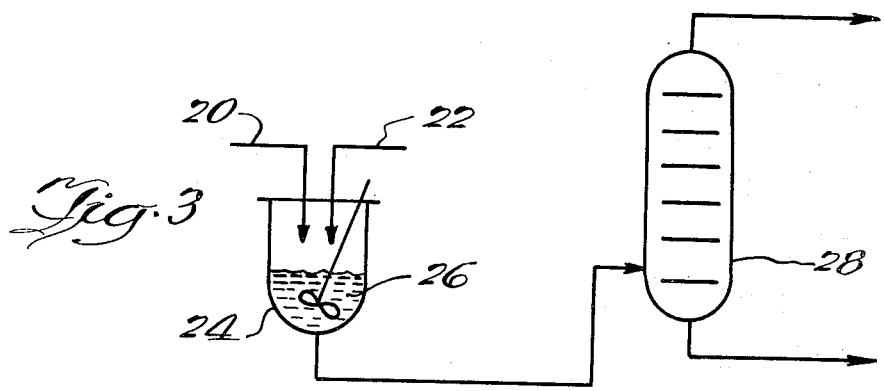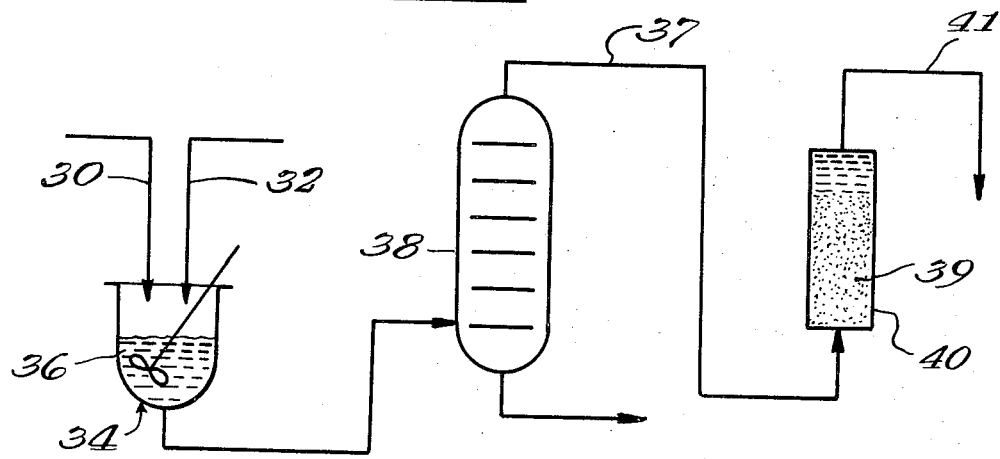

3,819,510

METHOD FOR PRODUCING HIGH QUALITY POLYMERIZATION REACTION MEDIA

INTRODUCTION

This invention relates to the production of high quality, purified, polymerization reaction media which upon its subsequent use in polymerization reactions provides a substantial increase in yield and rate of polymerization.

Generally, polymerization reactions such as those occurring in solution polymerization or particle form polymerization take place using some type of reaction media. In such cases, it is required that the reaction media being utilized is substantially pure in order to achieve acceptable polymerization rates and yields.

Techniques for purifying such polymerization media including molecular sieve treatment and treatment with metal alkyl compounds have been met with only limited success. Therefore, it would be highly advantageous in the art if a process were developed whereby the reaction media could be more highly purified and thereby provide higher reaction rates and yields.

OBJECTS

It is an object of this invention to provide a process for producing a high quality, purified polymerization media.

It is another object of this invention to provide a process for producing a high quality polymerization media for polyolefins which is particularly suited for use in solution or particle form polymerization processes.

It is a more particular object of this invention to provide a process for producing such high quality, polymerization reaction media which is especially applicable for use in producing polyethylene by way of solution or particle form polymerization processes.

It is further an object of this invention to provide such high quality reaction media by a process which is efficient, simple and economical.

Other objects and advantages of this invention will become apparent upon reading the following detailed description and upon reference to the drawings in which:

FIG. 1 is a block diagram describing the process steps of this invention;

FIG. 2 is a schematic drawing of an embodiment of this invention;

FIG. 3 is a schematic drawing of another embodiment of this invention; and

FIG. 4 is a schematic drawing of a preferred embodiment of this invention.

While this invention will be described in connection with specific embodiments, it will be understood that it is not intended to limit the invention to such embodiments. On the contrary, it is intended to cover all alternatives, modifications and equivalents as may be included within the spirit and scope of this invention as defined by the appended claims.

DESCRIPTION OF THE INVENTION

Turning to FIG. 1, the process for producing a high quality, purified polymerization medium according to this invention is shown in block diagram form, and comprises the steps of:

a. admixing a metal alkyl compound and polymerization reaction medium preferably with stirring or other type of agitation, and b. raising the temperature of the metal-alkyl-compound-polymerization-reaction-medium mixture to a temperature from about ambient to about the critical temperature of the polymerization reaction medium for about 1 minute to about 180 minutes, and c. separating substantially all of the resulting reaction products and the excess metal alkyl compound from the polymerization reaction medium thereby obtaining the high quality, purified polymerization medium.

According to this invention the first step of the process disclosed herein requires admixing a metal alkyl compound with a polymerization reaction medium. Generally, the polymerization reaction medium is a saturated or aromatic hydrocarbon or a derivative thereof or mixtures thereof. These substances contain about three to about twenty carbon atoms. Examples are pentanes, hexanes, heptanes, octanes, nonanes, decanes, undecanes, dodecanes including but not restricted to such isomers and mixtures as isopentane, isobutane, isohexane, 3-methylpentane, 2-dimethylbutane, 2,3-dimethylbutane, Isopar, toluene, xylenes and the like.

The metal alkyl compounds utilized in the process of this invention must be at least partially soluble in the medium to be purified. While such metal alkyl compounds may vary, they are preferably those having about two to about 10 carbon atoms in each alkyl group and, more preferably, about three to about eight carbon atoms. Their halide or hydride derivatives are useful also. The metal component of the metal alkyl compound is usefully selected from the Periodic Groups I, II and III. More preferably, it is selected from the group consisting of lithium, sodium, potassium, beryllium, magnesium, calcium, zinc, boron and aluminum. Most preferably, alkyl aluminum compounds such as triisobutylaluminum, triethylaluminum, diethylaluminum chloride, diisobutylaluminum hydride, and the like are used.

It is thought that the metal alkyl compound which is added to the polymerization reaction medium reacts with impurities contained therein to form separable reaction products. Such impurities may be water, aldehydes, ketones, carboxyl compounds, mercaptans and the like. The amount of metal alkyl compound added will depend on the purity level of the polymerization medium being purified. Therefore, if the polymerization medium has a high impurity content more metal alkyl compound will be necessary. Likewise if there is a low impurity content, less metal alkyl compound will be needed. Usefully, less than about one part of metal alkyl compound per 500 parts, more preferably 5,000 parts, of polymerization medium is necessary for producing a high quality, purified polymerization grade medium.

After the metal alkyl compound is admixed with the polymerization reaction medium the resulting mixture is brought to a temperature from about ambient to about the critical temperature of the medium. More preferably, the temperature range is from about 20°C. to about 250°C., and most preferably, about 30°C. to about 200°C. It is held at this temperature from about 1 minute to about 180 minutes. While the mixture could also be sustained in this temperature range for periods of time in excess of 180 minutes such would not normally be necessary or desirable. Note should be made, however, that excessively high temperatures, ones in excess of about 200°C., can result in the decomposition of some metal alkyl compounds. Specific time and temperature reaction conditions will depend upon the type of polymerization reaction medium to be purified and the metal alkyl compound utilized as can be appreciated by one skilled in the art.

As the metal-alkyl-compound-polymerization-reaction-medium mixture is prepared and heated, the metal alkyl compound reacts with the impurities in the polymerization reaction medium to form various reaction products. In the final step of the process of this invention such reaction products and excess metal alkyl compounds are separated from the purified polymerization reaction medium. Separation may be effected in many ways but in the embodiments of this invention shown, it is accomplished by the use of either an adsorbent material or distillation. Both of these alternate methods of separation are discussed in detail below.

Turning now to FIG. 2, the process of this invention is more specifically illustrated in an embodiment of this invention. An impure polymerization reaction medium is fed into a stirred and heated mixing vessel 14 by way of line 10 along with metal alkyl compound which is added by way of line 12. The metal alkyl compound and the polymerization reaction medium mixture is then heated to a temperature of about 20°C. to about 250°C. for about 1 minute to about 180 minutes.

After the metal-alkyl-compound-polymerization-reaction-medium mixture 16 has been warmed and aged it may be passed, depending upon the temperature used for heating, through a heat exchanger 18 whose cooling medium enters the heat exchanger 17 and exits at 19. The mixture 16 may be cooled to the desired temperature thereby.

Upon exiting the heat exchanger, if one is used, the mixture 16 is passed, by way of line 21, through a bed 22 made up of adsorbent material in column 23. Major classes of adsorbent material 22 which can be utilized are aluminum oxides, silica gels, crystalline zeolites and activated carbons.

Aluminum oxide materials are made by activating bauxite by heating. The preferred aluminum oxides are trihydrated bauxite or alumina trihydrate. The bauxites when manufactured under U.S. Pat. Nos. 1,868,869 and 2,015,593 are termed activated alumina. The manufacturers of alumina are Alcoa, Reynolds, Kaiser, Fisher Scientific, Filtrol, Catalysts and Chemicals, Inc. and Bio-Rad Laboratories. The Floridin Company produces an activated alumina called Florite.

Silica gel is a hard granular porous material made by precipitating silicic acid. Silica gels are manufactured by J. T. Baker Chemical Company, Davison Chemical Company, E. I. du Pont de Nemours, Eagle Chemical Company, Electrochemical, Pilot Engineering Company, Culligan Zeolite and Socony Mobil Oil (Mobil beads).

Crystalline zeolites are relatively new complex aluminosilicates. They are different from the other commercial adsorbents in being crystalline rather than amorphous and, in addition, have pore openings of fixed and uniform diameter.

From a practical point of view the availability of the natural zeolite is definitely limited. The commercial or synthesized crystalline zeolites are manufactured by Linde Company, Division of Union Carbide Corporation, under the trade name "Linde Molecular Sieves" and by Davison Chemical Company, a division of the W. R. Grace Company under the trade name "Microtraps."

The molecular sieve materials are available, for example, as; cylindrical pellets, ⅛ inch and 1/16 inch in diameter; as spherical pellets, 4 × 8 and 14 × 30 mesh; and as powder, 0.5 to 5 microns in size.

Of the various adsorbent materials described above, the molecular sieves are preferred in the process of this invention and the 13X type molecular sieves are the most preferred. However, when a molecular sieve material is used as the adsorbent material 22, the temperature of the mixture 16 entering column 18 must be less than about 120°C. If the temperature is higher than about 120°C., the molecular sieve adsorbent material in bed 22 acts as a cracking catalyst for certain media and may crack the polymerization medium portion of mixture 16.

The purified polymerization medium 24 which has passed through the adsorbent bed 22 should have an effective alkyl concentration not greater than about $10^{-3}$ to $10^{-4}$, preferably less than about $10^{-5}$, grams per milliliter. This insures, inter alia, that the reaction products have been completely separated. Once more than about $10^{-3}$ to $10^{-4}$, preferably about $10^{-5}$, grams of effective alkyl per milliliter of purified polymerization medium emerges in the purified polymerization medium 24, the adsorbent material 22 should be regenerated or changed.

The amount of adsorbent material utilized will depend on the particular polymerization medium being purified as well as the rate at which it is being passed through column 23. In any case, however, enough adsorbent material 22 must be used to produce the about $10^{-3}$ to $10^{-4}$, preferably about $10^{-5}$ grams, per milliliter effective alkyl level in the purified polymerization medium.

In another embodiment of this invention shown in FIG. 3, the purified polymerization medium component is separated from the mixture 26 by a distillation step. This is accomplished by passing the mixture 26 directly from the mixing vessel 24 to a distillation column 28. Separation of the purified polymerization medium from the metal alkyl compound and reaction products by distillation eliminates the need of cooling the mixture 26 as in the case where an adsorbent material is utilized for separation. The various operating parameters of the distillation column such as the reflux ratio, the number of plates and operating temperatures and pressures will depend upon, to a major extent, the boiling point of the polymerization medium component of the mixture 26. Generally, however, the reflux ratio is adjusted so that the alkyl concentration in the purified medium is less than about $10^{-3}$ to about $10^{-4}$, preferably about $10^{-5}$, grams of effective alkyl per milliliter. Heating in this embodiment is most easily done in column 28.

In a preferred embodiment of the instant invention, the polymerization reaction medium after distillation as in FIG. 3 is passed through an adsorbent bed made from such materials as aluminum oxides, silica gels, crystalline zeolites or activated carbon. To be more explicit reference is made to FIG. 4 where purified polymerization reaction medium in line 37 is passed through an adsorbent bed 39 contained in column 40. This additional contacting with an adsorbent material permits final removal of impurities, particularly excess metal alkyl compound. The effluent in line 41 is then recycled back to the polymerization process. Optionally, an additional absorption bed may be used on the impure polymerization media in line 30 prior to entrance in and treatment with metal alkyl compound in mixing vessel 34 (not shown in FIG. 4). Additionally, depending upon the distillation temperature, cooling may be necessary after distillation in tower 38 and prior to the contacting in column 40 (not shown in FIG. 4). FIG. 4 shows the arrangement where the purified polymerization reaction medium is more volatile than the impurities.

In order to illustrate the effectiveness of the process of this invention, various comparative polymerization runs were conducted wherein catalyst compositions were utilized to polymerize ethylene in a particle form process under substantially identical conditions except that the hexane polymerization media utilized in the runs differed in mode of purification. For one polymerization run the hexane was purified by being passed through active 13X (Linde) molecular sieve adsorbent material. For a second run, the hexane was purified in accordance with the process of this invention. Table I below summarizes the polymerization conditions and the yield and rate results produced by the differently purified polymerization media.

The superiority of the purification process of the instant invention over sieving for polymerization is clearly shown. The polymerization hexane treated by the process of the instant invention shows a yield 3.5 times greater than that of the sieved-only hexane. Further, a polymerization rate 3.3 times greater is also noted.

The high quality, polymerization media produced in accordance with this invention can also be utilized in continuous polymerization reaction processes. One particular defect which plagued the prior art in continuous polymerization reaction processes, particularly in the particle form polymerization of ethylene was that catalyst activity decreased as subsequent charges of catalysts were added to the reaction system. For example, in a polymerization run where catalyst was used in a continuous, stirred-tank reactor using sieved-only hexane for the particle form polymerization of ethylene, the rate of the first charge of catalyst decreased from about 4,500 grams of polymer per gram of catalyst per hour initially to about 2,000 grams per gram of catalyst per hour after 2 hours. Further, the activity of the second charge of catalyst decreased from 4,500 grams per gram of catalyst per hour initially to 500 grams per gram of catalyst per hour after 2 hours in the reactor. Typically, the yields of polymer obtained per gram of catalyst in such continuous, stirred-tank reactors at steady state are less than 25 percent of those obtained in a batch type reaction process.

When polymerization media treated in accordance with the instant invention is utilized in an ethylene, particle-form polymerization carried out in a continuous, stirred-tank reactor the results are different and are shown below in Table II.

TABLE II

The Effect of TIBAL Treated Hexane on Ethylene Polymerization Reactions in Stirred-Tank Reactors

| | |
|---|---|
| Catalyst | 2 weight percent $CrO_3$ on Grace-Davison 952 silica |
| Total Reactor Pressure | 600 p.s.i.g. |
| Reaction Temperature | 200°F. |
| Mean Residence Time in Reactor | 3.5 hours |
| Hexane Rate to Reactor | 3 gallons per hour |
| Catalyst Rate to Reactor | 0.77 grams per hour |
| TIBAL Rate to Reactor | 0.59 grams per hour |
| Total Operating Time | 25 hours |
| Total Production | 29,770 grams |
| Polymerization Yield | 15,400 grams of polymer per gram of catalyst |
| Hexane Treatment | Treated in accordance with this disclosure using TIBAL |

TABLE I

The Effect of TIBAL Treated Hexane In Batch Type Ethylene Polymerization Reactions

| Conditions | A | B |
|---|---|---|
| Catalyst | 2 weight percent $CrO_3$ on Grace-Davison 952 silica | 2 weight percent $CrO_3$ on Grace-Davison 952 silica |
| Total Reactor Pressure | 600 p.s.i.g. | 600 p.s.i.g. |
| Reaction Temperature | 210°F. | 200°F. |
| Catalyst Concentration | 0.085 grams per gallon of hexane | 0.09 grams per gallon of hexane |
| Promoter * Concentration | 0.80 grams per gallon of hexane | 0.022 grams per gallon of hexane |
| Hexane Treatment | 13X molecular sieves only | Treated in accordance with this disclosure using TIBAL |
| Yield | 3,100 grams of polymer per gram of catalyst | 10,700 grams of polymer per gram of catalyst |
| Polymerization Rate | 1,000 grams polymer per gram per hour | 3,300 grams polymer per gram per hour |

* Promoter used was (i-Bu)$_3$Al(TIBAL).

It is seen from Table II that the yield of 15,400 grams of polymer per gram of catalyst is 1.5 times that of the corresponding batch experiment summarized in Table I. However, what is more important is the fact that the rate of each charge of catalyst made after 4.5 reactor displacements is about the same as that of the first charge. In other words, the rate of each charge of catalyst is about the same as that of the preceding one. Hence, use of alkyl treated polymerization media not only results in the unexpected result of greater yields relative to a batch process but also maintains catalyst rate as the reaction proceeds. In conclusion, it can be said that the process of this invention provides a high quality, purified polymerization medium in an efficient, facile and economic manner. Furthermore, it promotes increased rates and yields in both batch and continuous reaction systems. Also with regard to continuous reaction systems polymerization media produced in accordance with the process of this invention provides for sustained catalyst rate.

EXAMPLE

A catalyst system made from $Mg(OH)_2$, $AlCl_3$ and $TiCl_4$ was metered into a continuously operated stirred-tank reactor as a slurry. The catalyst slurry composition as well as the commensurate operating conditions are summarized in Table III. The hexane used was polymerization grade material after it had been contacted with 13X molecular sieves. Under these conditions, only a trace of polymer was produced.

Once it was established that the reaction under the conditions specified above would not proceed, a change in the treatment of the hexane pumped into the reactor was made. The hexane was first contacted with 13X molecular sieves as before. Then 0.6 grams of triethylaluminum per gallon were added to the hexane. The temperature of the resulting solution was then raised to 210°F. and maintained at that temperature for about 30 minutes. The solution was then cooled to about 30°F. to 70°F. and contacted with 13X molecular sieves again in order to remove substantially all excess metal alkyl compound and reaction products from the hexane before it was pumped into the reactor.

After 93 percent of the untreated hexane had been displaced from the reactor by the alkyl treated material, polymerization began. The average yield of polymer based on the amount of $TiCl_4$—$AlCl_3$—$Mg(OH)_2$ charged to the reactor was 17,000 grams of polymer per gram of catalyst. The life of a charge of catalyst in the reactor was about 1 hour.

TABLE III

| Polymerization Conditions | |
| --- | --- |
| Temperature | 180°F. |
| Total Pressure | 700 p.s.i.g. |
| Ethylene Pressure | 550–575 p.s.i.g. |
| Hydrogen Pressure | 125–150 p.s.i.g. |
| Total Hexane Rate | 6 gallons per hour |
| Space Time | 1 Hour |
| Catalyst Slurry Rate | 1 gallon per hour |
| Catalyst Slurry Composition | 0.15 grams catalyst and 2.25 grams triethylaluminum per gallon of hexane |

Effective alkyl concentration (measured by determining the aluminum concentration in the purified polymerization reaction medium and expressing the result as grams per milliliter of aluminum alkyl compound of formula the same as the metal alkyl compound used in the purification process) was monitored in this example and in the runs described in Tables I and II as about $10^{-5}$ grams per milliliter.

What is claimed is:

1. A process for producing high quality, polymerization media comprising the steps of:
   a. admixing an alkyl metal compound selected from the group consisting of trialkyls, alkyl hydrides and alkyl halides, wherein the alkyl radical contains from about two to about 10 carbon atoms, of elements of Groups IA, IIA and IIIA of the Periodic Table; and
   b. at least one liquid saturated or aromatic hydrocarbon, wherein said hydrocarbon contains about three to about 20 carbon atoms, such hydrocarbon containing polar impurities, to form a mixture containing less than about one part of said alkyl metal compound per 500 parts of said hydrocarbon;
   c. raising the temperature of said mixture to a temperature below about the critical temperature of said hydrocarbon; and
   d. separating (1) the reaction products of said alkyl metal compound and said polar impurities, and (2) unreacted amounts of said alkyl metal compound from the product of step (c) until the effective alkyl concentration of said product of step (c) is not greater than about $10^{-3}$ to $10^{-4}$ grams per milliliter.

2. The process of claim 1 wherein said alkyl metal compound is selected from the group consisting of trialkylaluminums, dialkylaluminum bromides, dialkylaluminum chlorides and dialkylaluminum hydrides.

3. The process of claim 2 wherein the temperature used in step (c) is between about 20°C. and about 250°C.

4. The process of claim 3 wherein said separating in step (d) is accomplished by distillation.

5. The process of claim 3 wherein said separating in step (d) is accomplished by contacting said product of step (c) with a material selected from the group consisting of an aluminum oxide, a silica gel, a crystalline zeolite and an active carbon.

6. The process of claim 3 wherein said separating in step (d) is accomplished by contacting said product of step (c) with a crystalline zeolite.

7. The process of claim 4 wherein said hydrocarbon has been prepurified by contacting with a material selected from the group consisting of an aluminum oxide, a silica gel, a crystalline zeolite and an active carbon.

8. The process of claim 5 wherein said hydrocarbon has been prepurified by contacting with a material selected from the group consisting of an aluminum oxide, a silica gel, a crystalline zeolite and an active carbon.

9. The process of claim 6, wherein said hydrocarbon has been prepurified by contacting with a material selected from the group consisting of an aluminum oxide, a silica gel, a crystalline zeolite and an active carbon.

10. The process of claim 4 wherein said alkyl metal compound is a trialkylaluminum or a dialkylaluminum hydride and the temperature used in step (c) is between about 30°C. and about 200°C.

11. The process of claim 5 wherein said alkyl metal compound is a trialkylaluminum or a dialkylaluminum hydride and the temperature used in step (c) is between about 30°C. and about 200°C.

12. The process of claim 6 wherein said alkyl metal compound is a trialkylaluminum or a dialkylaluminum hydride and the temperature used in step (c) is between about 30°C. and about 200°C.

13. The process of claim 7 wherein said alkyl metal compound is a trialkylaluminum or a dialkylaluminum hydride and the temperature used in step (c) is between about 30°C. and about 200°C.

14. The process of claim 8 wherein said alkyl metal compound is a trialkylaluminum or a dialkylaluminum hydride and the temperature used in step (c) is between about 30°C. and about 200°C.

15. The process of claim 9 wherein said alkyl metal compound is a trialkylaluminum or a dialkylaluminum hydride and the temperature used in step (c) is between about 30°C. and about 200°C.

* * * * *